United States Patent [19]

Ward

[11] Patent Number: 5,068,902

[45] Date of Patent: * Nov. 26, 1991

[54] METHOD AND APPARATUS FOR REDUCING ACOUSTICAL DISTORTION

[75] Inventor: Gary L. Ward, Roanoke, Va.

[73] Assignee: Epic Corporation, Hardy, Va.

[*] Notice: The portion of the term of this patent subsequent to Mar. 7, 2006 has been disclaimed.

[21] Appl. No.: 318,832

[22] Filed: Mar. 6, 1989

Related U.S. Application Data

[60] Division of Ser. No. 932,812, Nov. 19, 1986, Pat. No. 4,811,402, which is a continuation-in-part of Ser. No. 930,778, Nov. 13, 1986, abandoned.

[51] Int. Cl.$^5$ .................... H04R 25/00; H04R 25/02; A61B 7/02

[52] U.S. Cl. .................... 381/68.6; 181/130; 181/135; 381/68; 381/68.7

[58] Field of Search .................... 381/68, 68.6, 68.7, 381/187; 181/130, 135

[56] References Cited

U.S. PATENT DOCUMENTS 4,811,402  3/1989  Ward .................... 381/69
4,969,534  9/1990  Kolpe et al. .................... 181/130

Primary Examiner—Jin F. Ng
Assistant Examiner—William D. Cumming
Attorney, Agent, or Firm—Rogers & Killeen

[57] ABSTRACT

A method and apparatus for reducing distortion of an acoustical waveform by locating a plurality of microspheres to interact with interfering acoustical waveforms are described.

36 Claims, 2 Drawing Sheets

METHOD AND APPARATUS FOR REDUCING ACOUSTICAL DISTORTION

This is a division of application Ser. No. 932,812, filed Nov. 19, 1986, now U.S. Pat. No. 4,811,402 which was a continuation-in-part of application Ser. No. 930,778 filed Nov. 13, 1986, now abandoned.

FIELD OF THE INVENTION

This invention relates to a method and apparatus for reducing acoustical distortion of the output of an electro-acoustical transducer.

BACKGROUND

All electro-acoustic transducers provide some degree of undesired change in acoustical waveform, i.e. distortion. Distortion is commonly divided into three types, i.e. frequency distortion, amplitude distortion (harmonic distortion) and phase distortion. Harmonic and phase distortion are particularly troublesome when the output acoustical transducer is located in a confined space or cavity, for example, in a hearing aid, sound head set or telephone receiver. Often the cavity has a "tuned" frequency and the materials in the cavity have resonant frequencies which, when coupled with the waveform from the transducer, result in peaks or spikes in the waveform corresponding to harmonic frequencies of the waveform, i.e. harmonic distortion. Additionally, phase shifts in the waveform can occur which produce distortion and also result in harmonic distortion where the resonant peaks persist for a period of time after the desired pulse. These effects can be heard by the listener as an annoying ringing.

With amplified hearing devices, such as hearing aids, the input signal is amplified so that the wearer of the aid receives an amplified signal which should correspond to the waveform of the input signal. However, noise and other extraneous signals are also amplified which create a problem of clarity and make it difficult for the wearer of the aid to "focus" on the desired sound. It has recently been found that much of the difficulty associated with focusing is due to the presence of harmonic distortion in the amplified signal. Minimizing harmonic and phase distortions provide much greater clarity in the amplified sound and allow the listener using the amplification device to more readily focus on the desired sounds.

Feedback to the input transducer can also be a problem with devices such as hearing aids in which the input transducer is located in close proximity to the output transducer. The amplification of such feedback or resonance waves can result in "ringing" which can be unpleasant to the wearer of the hearing aid. Additionally, in the real world, the amount of usable gain available with a hearing aid varies depending upon the complexity of the signal being amplified. H. C. Schweitzer, *Hearing Instruments*, Volume 37, Nos. 1 and 2, 1986. Consequently, distortion can result in a lower output of the hearing aid and, therefore, a lower usable gain available for amplification.

To date, efforts to remedy the problems associated with lack of clarity and distortion in amplified signals have primarily focused on modifications in the electronic components and in physical placement of such components. The effect that materials of construction might have were considered in the past but were not found to be significant. It has been reported that: "Ear mold material was once considered a factor in the acoustic performance [of] ear molds. Except for the way in which the material might influence the tightness of the seal in the ear canal, it appears insignificant acoustically." S. F. Lybarger, "Earmolds", *Handbook of Clinical Audiology*, J. Katz, Editor, 1972, The Williams and Wilkin Company. Materials such as sintered pellets, mesh screens, lamb's wool and cotton have been used as acoustic obstructions (filters) in the earmold and earphone tubing or earhook to increase acoustic resistance to modify response peaks. *Hearing Aid Assessment and Use in Audiologic Habilitation*, William R. Hodgson, Editor, 3rd Ed. p. 85 and p. 93 (1986). These obstructions, however, can cut down gain and output and can add distortion at higher acoustic pressures.

Although great advances have been made in providing electronic components which reduce distortion and improve clarity, lack of clarity in the output of acoustical transducers and difficuties associated with focusing on sounds continue to be problems. Consequently, there is a need for methods and apparatus for minimizing the distortions which can occur when acoustic waveforms are generated particularly in a confined space.

It has now been found that the above-described problems associated with harmonic distortion and feedback can be minimized by the use of a plurality of microspheres located in relation to the output transducer to interact with interfering waveforms. When the microspheres are used, a significant decrease in the total harmonic distortion is achieved particularly when the transducer or its output waveforms are in a confined space, such as an ear canal. Additionally, when the microspheres are used in the shell or housing to contain the input and output transducers, amplifier and associated electronics, significant reductions in total harmonic distortion and feedback are observed.

Both solid and hollow microspheres are well known as fillers in the plastics industry. They are commonly used as extenders and the hollow microspheres find application where it is desirable to reduce the weight of the polymeric product and improve stiffness and buoyancy. However, the reduction in distortion of acoustic waveforms is totally unexpected in view of the reported acoustical properties of cellular polymers. As set forth in the Encyclopedia of Polymer Technology:

> "The acoustical properties of polymers are altered considerably by their fabrication into a cellular structure. Sound transmission is altered to only a minor extent since it depends predominantly upon the density of the barrier (in this case, the polymer phase). Cellular polymers are, therefore, very poor materials to use by themselves in order to produce sound transmission. They are quite effective in absorbing sound waves of certain frequencies (24). Materials with open cells on the surface are particularly effective in this respect."

Encyclopedia of Polymer Science and Technology, Herman F. Mark, Editor, 1970. As set forth in Volume 12, page 716, of the same series, "open-celled foams provide good sound deadening whereas hard, closed-cell foams have only slight absorption"; and on page 706, "since widespread friction of the air in the foam is important, closed-celled foamed polymers are in general not suitable for air-borne sound absorption." Accordingly, there is no suggestion in the known art of the advantages of the instant invention.

SUMMARY OF THE INVENTION

In one embodiment, the instant invention comprises a method for reducing acoustical distortion of an acoustical waveform produced by an electro-acoustical transducer. The method comprises providing a plurality of microspheres adjacent to the transducer to interact with interfering waveforms.

In another embodiment, the instant invention comprises a method for reducing acoustical distortion of an acoustical waveform produced by an acoustical transducer. The method involves placing the transducer within a composite which comprises a polymeric matrix and microspheres.

In another aspect, the instant invention comprises a method for reducing distortion in an in-the-ear hearing aid having an input transducer, an amplifier and an output transducer. The method involves encasing the transducers and amplifier in a shell which comprises a polymeric matrix containing microspheres.

In a further embodiment, the instant invention involves an acoustical output assembly having a housing which contains (a) a means for producing an acoustical waveform, and (b) a plurality of restrained microspheres.

In a still further embodiment, the instant invention involves an in-the-ear hearing aid which comprises a microphone to convert acoustical waveforms to electrical waveforms. The microphone is connected to an amplifier to amplify the electrical waveforms and supply the amplified waveforms to a receiver electrically connected to the amplifier. The amplified electrical waveforms are converted to acoustical signals by the receiver. The microphone, amplifier, and receiver are located within a shell which is composed of a polymeric matrix containing microspheres.

DETAILED DESCRIPTION OF THE INVENTION

Figure 1:
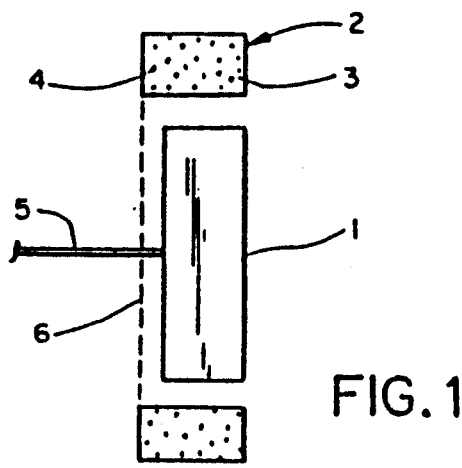
FIG. 1 is a cross-sectional schematic representation of an acoustical output transducer with a microsphere composite proximately located to said transducer.

The terms "acoustical output means", "output transducer" and "receiver" are used interchangeably herein to refer to devices for converting electrical waveforms to acoustical waveforms.

The terms "input transducer" and "microphone" are used herein to refer to devices for converting acoustical waveforms to electrical waveforms.

It has been found that acoustical distortion particularly due to harmonic distortion can be decreased by placing microspheres so that they interact with potentially interfering waveforms. Significant improvements in clarity of sound produced with, for example, an in-the-ear hearing aid can be obtained. The decrease in total harmonic distortion obtained provides a greater useful gain in the devices. Also, the "focus" of the listener to the desired sound is greatly improved. While not wishing to be bound by the theory, it is believed that the microspheres act to "break up" standing waves and prevent build up of transient nodes.

The microspheres useful in the instant invention are materials which are commonly used as fillers in the plastic industry. The microspheres can be solid or hollow and can be made of a variety of materials, e.g. siliceous, ceramic, glass, polymeric and minerals such as silica and alumina. Depending upon whether the microspheres are hollow or solid and the material of construction, the diameter of the microspheres can range from about 5 up to about 5000 microns. Solid glass microspheres can be manufactured from a variety of glass types, for example A-glass. The silicate-based microspheres have compositions which can be modified with organic compounds. These are commonly supplied as hollow microspheres. The polymeric materials can be formed from thermoplastic as well as thermoset resins. Commonly, phenolic thermoset resins are used to prepare these materials. Ceramic microspheres are commonly alumino-silicate ceramics although other ceramic compositions can be used. It is also contemplated that objects with shapes other than spherical, e.g. rectangular, cubic, etc., as well as objects with sizes greater than 5000 microns, can be used to reduce harmonic distortion and increase the clarity of sound. For ease of fabrication and commercial availability, the smaller size spheres are preferred.

In the instant invention, it is preferred that hollow microspheres be used. Preferably the microspheres have a diameter of about 5 to about 1000 microns. More preferably, the diameter of the microspheres is between about 10 and about 200 microns. Normally the microspheres are produced with a distribution of sizes. When the microspheres are used in an in-the-ear hearing aid, it has been found that good results can be obtained with microspheres having a mean diameter between about 50 and about 100 microns and particularly about 70 microns. It is also preferred that hollow glass microspheres be used.

In the practice of the instant invention, the microspheres are placed so as to interact with interfering acoustical waveforms. It has been found that a reduction in distortion can be obtained when the microspheres are used to coat the inside surface of a housing containing an acoustical output transducer. The most effective location for the microspheres can be readily determined with minimal experimentation by a skilled person. Normally, it is preferred that the microspheres be placed proximately to the output transducer, and most preferably that the microspheres substantially surround the output transducer. For a given amount of microspheres, the effect is normally maximized if the output transducer is substantially surrounded by the microspheres, i.e. that the microspheres be placed in proximity to at least four of the six sides of a rectangular transducer. Of course, it is contemplated that a pathway for the acoustical output is provided from the transducer. The microspheres can be used in the form of a coating of a housing, shell or transducer case as described hereinabove or can be included as a component in the housing or shell as in a telephone receiver housing or a hearing aid shell.

For convenience, it is preferred that the microspheres be contained in a polymeric matrix. The composition of the polymeric matrix is selected based on the end use according to the physical properties of the polymeric material and its formability. Also, the physical properties of the final composite comprising the matrix and the microspheres must be considered in view of the end use. For example, for uses such as in a telephone receiver, the polymeric material should be rigid and tough to provide the necessary structural integrity. In uses where the material will be in intimate contact with the human body, for example, an in-the-ear hearing aid, factors such as allergic response to the polymeric material or monomers and additives contained therein must be taken into account. For uses requiring a rigid, tough matrix, resins such acrylonitrile-butadiene-styrene (ABS), polystyrene, polyethylene, polypropylene, polyamides, polyamideimides, polyesters, polyurethanes, etc., can be used. These materials can be crosslinked or contain other fillers and additives in addition to the microspheres. Commonly for uses such as ear molds, more flexible materials can be used which can include silicones, polyvinyls, both hard and soft acrylics such as poly(methyl methacrylate) and the like.

The loading of the microspheres in the polymeric matrix depends upon the end use of the resulting composite material. Other things being equal, the extent to which disruptive signals are damped increases as the level of microspheres increases. Normally, the amount of microspheres in the polymeric matrix ranges from about 5 to about 75 volume percent of the resulting composite. However, as the loading level of microspheres in the polymeric matrix increases, there can be a detrimental effect on certain physical properties of the matrix, e.g. a decrease in tensile strength. Consequently, the physical properties which are required for the composite determine the upper level of microspheres which can be incorporated into the matrix. Additionally, at the lower levels of microsphere loading a decrease in the effect of the microspheres on the distortion can be observed. Therefore, sufficient levels of microspheres must be incorporated in order to obtain the desired results depending upon the amount of composite material which can be used. Therefore, if the polymer matrix/microsphere composite is used in combination with or as an insert in other materials which do not contain microspheres, it is ordinarily desirable to use higher loadings of microspheres to obtain the desired result. In ordinary operation in an in-the-ear hearing aid, it is preferred that the microspheres comprise between about 10 and about 50 volume percent and most preferably about 10 to about 45 volume percent of the polymer matrix/microsphere composite.

Normally when incorporating microspheres into a polymeric matrix, a coupling agent is used to assure effective bonding between the polymeric matrix and the microsphere. Ordinarily with siliceous microspheres, a silane coupling agent can be used to treat the microspheres prior to incorporation into the polymeric matrix. Any such coupling agent normally used for this purpose can be used in the instant invention. However, in the event the material is to be in contact with human tissue, the pharmacological effects of the material must be considered.

As is well known by those skilled in the art, other additives can be incorporated into the polymeric matrix. For example, other fillers to affect or modify the physical properties of the matrix material can be incorporated. Additionally, additives such as antioxidants, stabilizers, lubricants, mold release agents, etc., can be used as appropriate.

The matrix/microsphere composite can be formed into the desired shape by any method known in the art for such forming. For example, as appropriate, the composite can be injection molded, cast into a mold form, or milled. Selection of the appropriate molding process depends upon the polymeric matrix being used and the end use of the product. For example, if ABS is used as the housing for a telephone receiver, it is expected that the composite would be injection molded into the proper form. However, in the event that the final article is an in-the-ear hearing aid, it is expected that a mold of the actual ear canal would be prepared and the polymeric material, for example polymethylmethacrylate, would be cast into the appropriate shape using the female mold of the ear canal. The electronics, including the output transducer, would then be attached to the composite material.

In a preferred embodiment of the instant invention, the matrix/microsphere composite substantially surrounds the output transducer. By "substantially" is meant that the composite surrounds at least four sides of the transducer; however, a pathway is provided through which the acoustic waveforms produced by the transducer can travel. The location of the composite material in this relationship to the transducer acts to dampen distorting vibrations which occur as the result of the transducer continuing to vibrate after activation as well as harmonic waveforms which are generated by resonance in the surrounding space and other materials in the space. These vibrations can result in out-of-phase secondary signals which produce harmonic distortion and/or feedback to the input transducer. Preferably, the composite material is formed into a housing for the output transducer and, more preferably, serves as a housing or shell to encase the output transducer and associated electronics, including the amplifier and input transducer.

With an in-the-ear hearing aid it is preferred that the composite material be used as the material of construction for the shell of the hearing aid. However, it is contemplated that the use of the composite material can be limited to its location around the output transducer with other material serving as the shell of the hearing aid unit. It is also contemplated that, as described hereinabove, the composite can be used as a coating on the surface of the housing or shell. For a behind-the-ear hearing aid, the composite material can be used as the housing for the electronics and/or it can be located in the conduits which conduct the amplified signal to the ear canal, and/or it can be used in an ear mold which fits in the ear canal.

Referring now to FIG. 1, a schematic representation of a transducer 1 is depicted with a composite material 2 composed of a polymeric matrix 3 containing microspheres 4 dispersed throughout the matrix located proximately to the transducer. When the transducer is activated by an electrical signal passing through connector 5, acoustical waveforms are generated. Secondary signals produced as the result of the transducer 1 continuing to vibrate after activation are reduced by the composite 2. As depicted by dotted line 6, it is preferred that the composite substantially surround the transducer.

Figure 2:
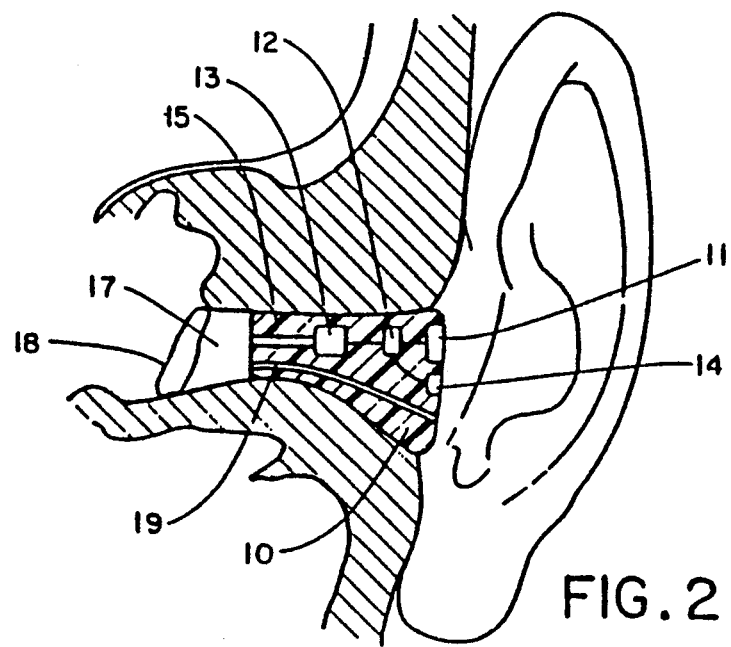
FIG. 2 is a cross-sectional schematic representation of an in-the-ear hearing aid having a shell comprised of a matrix/microsphere composite.

An in-the-ear hearing aid is schematically depicted in FIG. 2. The shell 10 is shown inserted in the ear canal. Within the shell 10 is contained an input transducer 11, an amplifier 12 and an output transducer 13. The transducers and amplifier are in electrical communication with one another. Optionally, the amplifier can be connected to a control means 14 which can serve to adjust the gain or output of the amplifier. Other electronic circuits and/or components can be incorporated as appropriate, but these are not represented. The output transducer 13 generates an acoustical signal into tube 15. These signals travel into the ear cavity 17 and impact on the ear drum 18. Commonly in such in-the-ear devices, a vent tube 19 can be provided to allow for equalization of pressure and minimize discomfort to the wearer. As depicted in FIG. 2, the polymeric matrix/microsphere composite is used to form the shell or housing of the hearing aid and serves to encase the electronic components, however, it is contemplated that the composite material can be used to simply surround the perimeter of the output transducer with another material used to form the remaining portion of the shell or housing. It is preferred that the shell or housing be prepared from the polymeric matrix/microsphere composite. This serves to minimize harmonic distortion as the result of vibrations transmitted through the material. Also, it minimizes feedback which occurs as the result of transmission of acoustic signals from the ear cavity 17 through the vent tube 19 and to the input transducer 11 as well as leaking between the shell and the ear canal.

Figure 3:
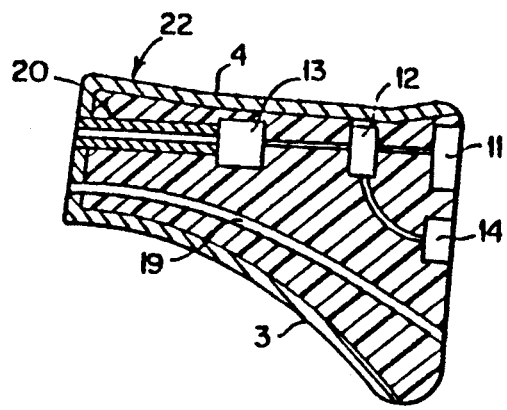
FIG. 3 is a cross-sectional schematic representation of an in-the-ear hearing aid having a microsphere/polymeric matrix composite coating on the interior surface of the shell and on the surface of the tube to the ear cavity.

FIG. 3 schematically depicts an in-the-ear hearing aid. The shell 10 has a coating 22 of a composite material 2 composed of a polymeric matrix 3 containing dispersed microspheres 4. The tube 15 also has a coating 20 of composite 2.

Figure 4:
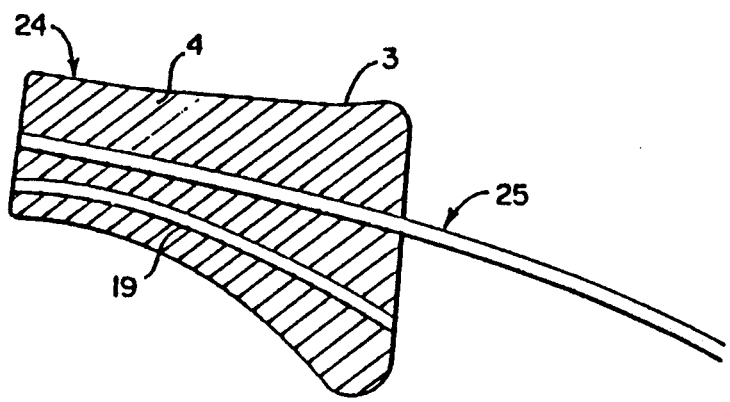
FIG. 4 is a cross-sectional schematic representation of an earmold for a behind-the-ear hearing aid formed from a microsphere/polymeric matrix composite.

FIG. 4 depicts an earmold 24 formed from a composite material 2 composed of a polymeric matrix 3 containing dispersed microspheres 4. A conduit 25 conducts the amplified signal to the earmold from the output transducer (not shown).

It has been found by spectral analysis that an electronic device (input and output transducers and amplifier) encased in poly(methyl methacrylate) without microspheres shows a phase shift accompanied by a time lag. This is thought to result from the combination of the applied signal adding with noise background in standing wave areas throughout the spectrum. In contrast, the use of microspheres in the poly(methyl methacrylate) matrix with the same electronic device was found to provide a signal which, while showing some small degree of phase shift, was approximate to the original signal. This effect reduces ringing and unwanted spikes thereby adding appreciably to the clarity of the amplified sound.

The polymeric matrix/microsphere composite can be prepared by methods well known to those skilled in the art. For example, when the matrix material is poly(methyl methacrylate), the shell can be prepared by slush molding by first preparing an impression of the cavity. A female cavity is then prepared to mirror the impression. Commonly, the acrylic used for slush molding the shell is a two-part catalyst cured system. The base material is fast polymerizing polymer commercially available in powder form and commonly used in the dental industry. The powder which contains the microspheres is mixed with methyl methacrylate monomer. The resulting slurry is poured into the mold and allowed to cure. This can be repeated to build up layers of the acrylic polymer to the desired final thickness. Unreacted monomer can be removed by heating the resinous body in hot water.

The following examples are intended by way of illustration and not by way of limitation.

EXPERIMENTAL

For the following tests, four instruments were assembled on open face plates. Two of the instruments had B-1 response curves, 40 dB ANSI gain and 109 dB MPO using Knowles electronics 1739 receivers as the output transducers. The other two instruments were assembled to have the same B-1 response curves with 40 dB ANSI gain and 117 dB MPO using Knowles electronics 1912 receivers as the output transducers. Knowles electronics 1842 input transducers were used for all four instruments. The amplifiers were standard LTI 505 chips.

Four shells were made for the right ear, two prepared from poly(methyl methacrylate) without microspheres and two from poly(methyl methacrylate) containing 35 volume percent hollow microspheres. The microspheres were bubble type B 23/500 from 3M Company which are reported to have chemical properties similar to a soda-lime-borosilicate glass. The microspheres are reported to have a crush strength of at least 500 pounds per square inch (34 Bars). The diameters of the microspheres range from about 10 to about 140 microns with an average diameter of about 70 microns. The microspheres (35 volume percent) were mixed by tumbling for 5 minutes at room temperature with the methyl methacrylate polymer (65 volume percent). The poly(methyl methacrylate) used was Audacryl RTC polymer grade 650 Z 2064 from Esschem Company having a reported molecular weight of about 400,000 to 500,000. Two parts by volume of the polymer-microspheres mixture were mixed with one part by volume methyl methacrylate monomer. The resulting mixture was stirred in a container for 30 seconds. The container with the mixture was then placed in a vessel for 2 minutes under 0.5 atmospheres pressure. The mixture was again stirred for 30 seconds and then poured into a mold cavity. The mixture was slushed and cured at room temperature until a matrix wall thickness of about 2.5 to 3.5 millimeters was obtained. The remaining mixture was poured from the mold cavity. The solid matrix was removed from the mold cavity and placed in a pressure vessel containing water at 180° F. and allowed to cure under 20 pounds per square inch gauge pressure for 30 minutes. No additional heat was added to the vessel so that the contents of the vessel cooled during the cure time. The matrix was then placed in boiling water for 20 minutes to complete the cure. Each of the resulting shells was finished by grinding and buffing to be as identical as possible.

Testing was done on the Frey electronics "phonix" 5500Z electro-acoustic test set. Battery voltage was calibrated at 1.35 VDC with the test box being leveled and calibrated to standards once every hour of use. Tubing length and coupler/aid positioning were duplicated to as close to identical positions as could be maintained. Each face plate was loaded to the shell, checked and run in the chamber. Volume controls were locked in "full-on" position. Electronics were changed after each test run to the next shell for a total cross check shell to shell, electronics to electronics. The tests were run according to ANSI S 3.22-1982 except as indicated in the following Tables.

The results of tests comparing material with microspheres to material without microspheres are given in Tables I through XII.

TABLE I

| With Microspheres | | | | Without Microspheres | | |
|---|---|---|---|---|---|---|
| Aid Gain db | Total Harmonic Dist. % | Aid In dB | Freq. In KHZ | Aid Gain dB | Total Harmonic Dist. % | Aid In dB | Freq. In KHZ |
| 4.5 |  | 70 | 0.100 | 8.0 |  | 70 | 0.100 |
| 15.5 |  | 70 | 0.125 | 12.0 |  | 70 | 0.125 |
| 17.5 |  | 70 | 0.160 | 14.5 |  | 70 | 0.160 |
| 22.5 |  | 70 | 0.200 | 19.5 |  | 70 | 0.200 |
| 26.0 |  | 70 | 0.250 | 22.5 |  | 70 | 0.250 |
| 30.5 |  | 70 | 0.315 | 24.5 |  | 70 | 0.315 |
| 34.5 |  | 70 | 0.400 | 26.5 |  | 70 | 0.400 |
| 38.0 | 10 | 70 | 0.500 | 27.5 | 8 | 70 | 0.500 |
| 40.5 | 13 | 70 | 0.630 | 29.5 | 19 | 70 | 0.630 |
| 41.0 |  | 70 | 0.710 | 30.0 |  | 70 | 0.710 |
| 41.5 | 7 | 70 | 0.800 | 30.0 | 12 | 70 | 0.800 |
| 43.0 | 13 | 70 | 1.000 | 32.0 | 23 | 70 | 1.000 |
| 44.5 | 8 | 70 | 1.250 | 34.5 | 18 | 70 | 1.250 |
| 46.0 |  | 70 | 1.500 | 35.5 |  | 70 | 1.500 |
| 46.5 | 19 | 70 | 1.600 | 36.0 | 22 | 70 | 1.600 |
| 39.0 |  | 70 | 2.000 | 38.5 |  | 70 | 2.000 |
| 39.0 |  | 70 | 2.500 | 38.5 |  | 70 | 2.500 |
| 37.0 |  | 70 | 3.150 | 36.0 |  | 70 | 3.150 |
| 35.0 |  | 70 | 4.000 | 34.5 |  | 70 | 4.000 |
| 35.0 |  | 70 | 5.000 | 33.5 |  | 70 | 5.000 |
| 21.0 |  | 70 | 6.300 | 21.0 |  | 70 | 6.300 |
| 19.0 |  | 70 | 8.000 | 10.5 |  | 70 | 8.000 |
| 3.0 |  | 70 | 9.999 | 3.0 |  | 70 | 9.999 |

TABLE II

| With Microspheres | | | | Without Microspheres | | |
|---|---|---|---|---|---|---|
| Aid Gain dB | Total Harmonic Dist. % | Aid In dB | Freq. In KHZ | Aid Gain db | Total Harmonic Dist. % | Aid In dB | Freq. In KHZ |
| 7.5 |  | 70 | 0.100 | 8.0 |  | 70 | 0.100 |
| 11.5 |  | 70 | 0.125 | 12.5 |  | 70 | 0.125 |
| 13.5 |  | 70 | 0.160 | 16.0 |  | 70 | 0.160 |
| 19.0 |  | 70 | 0.200 | 21.0 |  | 70 | 0.200 |
| 21.0 |  | 70 | 0.250 | 22.0 |  | 70 | 0.250 |
| 23.5 |  | 70 | 0.315 | 25.5 |  | 70 | 0.315 |
| 25.0 |  | 70 | 0.400 | 27.0 |  | 70 | 0.400 |
| 26.5 | 11 | 70 | 0.500 | 28.5 | 17 | 70 | 0.500 |
| 27.5 | 16 | 70 | 0.630 | 30.0 | 35 | 70 | 0.630 |
| 28.5 |  | 70 | 0.710 | 30.5 |  | 70 | 0.710 |
| 28.5 | 12 | 70 | 0.800 | 31.0 | 28 | 70 | 0.800 |
| 30.5 | 25 | 70 | 1.000 | 33.0 | 44 | 70 | 1.000 |
| 32.5 | 21 | 70 | 1.250 | 34.5 | 30 | 70 | 1.250 |
| 34.0 |  | 70 | 1.500 | 35.5 |  | 70 | 1.500 |
| 34.5 | 19 | 70 | 1.600 | 36.0 | 24 | 70 | 1.600 |
| 36.5 |  | 70 | 2.000 | 39.0 |  | 70 | 2.000 |
| 38.5 |  | 70 | 2.500 | 39.0 |  | 70 | 2.500 |
| 35.0 |  | 70 | 3.150 | 36.0 |  | 70 | 3.150 |
| 32.5 |  | 70 | 4.000 | 34.5 |  | 70 | 4.000 |
| 31.5 |  | 70 | 5.000 | 34.5 |  | 70 | 5.000 |
| 23.5 |  | 70 | 6.300 | 21.0 |  | 70 | 6.300 |
| 10.5 |  | 70 | 8.000 | 10.0 |  | 70 | 8.000 |
| 6.0 |  | 70 | 9.999 | −1.0 |  | 70 | 9.999 |

TABLE III

| With Microspheres | | | | Without Microspheres | | |
|---|---|---|---|---|---|---|
| Aid Gain dB | Total Harmonic Dist. % | Aid In dB | Freq. In KHZ | Aid Gain db | Total Harmonic Dist. % | Aid In dB | Freq. In KHZ |
| 4.5 |  | 75 | 0.100 | 11.0 |  | 75 | 0.100 |
| 5.0 |  | 75 | 0.125 | 12.0 |  | 75 | 0.125 |
| 4.5 |  | 75 | 0.160 | 15.0 |  | 75 | 0.160 |
| 9.5 |  | 75 | 0.200 | 16.0 |  | 75 | 0.200 |
| 12.5 |  | 75 | 0.250 | 18.0 |  | 75 | 0.250 |
| 19.0 |  | 75 | 0.315 | 22.0 |  | 75 | 0.315 |
| 24.5 |  | 75 | 0.400 | 23.5 |  | 75 | 0.400 |
| 28.0 | 1 | 75 | 0.500 | 25.5 | 11 | 75 | 0.500 |
| 28.5 | 2 | 75 | 0.630 | 26.0 | 17 | 75 | 0.630 |
| 28.5 |  | 75 | 0.710 | 26.5 |  | 75 | 0.710 |
| 28.0 | 4 | 75 | 0.800 | 27.0 | 19 | 75 | 0.800 |
| 29.5 | 10 | 75 | 1.000 | 29.5 | 35 | 75 | 1.000 |
| 31.5 | 7 | 75 | 1.250 | 32.0 | 23 | 75 | 1.250 |
| 34.5 |  | 75 | 1.500 | 35.0 |  | 75 | 1.500 |
| 35.5 | 22 | 75 | 1.600 | 35.5 | 31 | 75 | 1.600 |
| 38.5 |  | 75 | 2.000 | 38.5 |  | 75 | 2.000 |
| 37.0 |  | 75 | 2.500 | 37.5 |  | 75 | 2.500 |
| 35.5 |  | 75 | 3.150 | 36.0 |  | 75 | 3.150 |
| 32.0 |  | 75 | 4.000 | 32.0 |  | 75 | 4.000 |
| 35.0 |  | 75 | 5.000 | 33.0 |  | 75 | 5.000 |
| 13.0 |  | 75 | 6.300 | 15.0 |  | 75 | 6.300 |
| 7.5 |  | 75 | 8.000 | .5 |  | 75 | 8.000 |
| 8.5 |  | 75 | 9.999 | 4.5 |  | 75 | 9.999 |

TABLE IV

| With Microspheres | | | | Without Microspheres | | |
|---|---|---|---|---|---|---|
| Aid Gain db | Total Harmonic Dist. % | Aid In dB | Freq. In KHZ | Aid Gain dB | Total Harmonic Dist. % | Aid In dB | Freq. In KHZ |
| 14.5 |  | 75 | 0.100 | 9.0 |  | 75 | 0.100 |
| 16.5 |  | 75 | 0.125 | 13.0 |  | 75 | 0.125 |
| 19.0 |  | 75 | 0.160 | 15.5 |  | 75 | 0.160 |
| 24.0 |  | 75 | 0.200 | 19.0 |  | 75 | 0.200 |
| 27.0 |  | 75 | 0.250 | 21.5 |  | 75 | 0.250 |
| 30.5 |  | 75 | 0.315 | 23.5 |  | 75 | 0.315 |
| 34.0 |  | 75 | 0.400 | 25.0 |  | 75 | 0.400 |
| 36.5 | 41 | 75 | 0.500 | 26.5 | 37 | 75 | 0.500 |
| 39.0 | 41 | 75 | 0.630 | 27.5 | 45 | 75 | 0.630 |
| 39.5 |  | 75 | 0.710 | 28.0 |  | 75 | 0.710 |
| 40.0 | 40 | 75 | 0.800 | 28.5 | 49 | 75 | 0.800 |
| 41.5 | 46 | 75 | 1.000 | 30.5 | 55 | 75 | 1.000 |
| 42.0 | 38 | 75 | 1.250 | 31.5 | 44 | 75 | 1.250 |
| 42.5 |  | 75 | 1.500 | 31.5 |  | 75 | 1.500 |
| 42.5 | 35 | 75 | 1.600 | 32.0 | 35 | 75 | 1.600 |
| 44.0 |  | 75 | 2.000 | 34.0 |  | 75 | 2.000 |
| 44.0 |  | 75 | 2.500 | 34.5 |  | 75 | 2.500 |
| 42.5 |  | 75 | 3.150 | 32.0 |  | 75 | 3.150 |
| 40.0 |  | 75 | 4.000 | 30.0 |  | 75 | 4.000 |
| 40.5 |  | 75 | 5.000 | 30.0 |  | 75 | 5.000 |
| 27.0 |  | 75 | 6.300 | 17.0 |  | 75 | 6.300 |
| 7.0 |  | 75 | 8.000 | 7.5 |  | 75 | 8.000 |
| 3.0 |  | 75 | 9.999 | 3.5 |  | 75 | 9.999 |

TABLE V

| With Microspheres | | | | Without Microspheres | | |
|---|---|---|---|---|---|---|
| Aid Gain dB | Total Harmonic Dist. % | Aid In dB | Freq. In KHZ | Aid Gain db | Total Harmonic Dist. % | Aid In dB | Freq. In KHZ |
| 8.5 |  | 75 | 0.100 | 8.5 |  | 75 | 0.100 |
| 12.5 |  | 75 | 0.125 | 13.5 |  | 75 | 0.125 |
| 15.0 |  | 75 | 0.160 | 17.0 |  | 75 | 0.160 |
| 18.5 |  | 75 | 0.200 | 20.0 |  | 75 | 0.200 |
| 20.0 |  | 75 | 0.250 | 21.0 |  | 75 | 0.250 |
| 22.0 |  | 75 | 0.315 | 24.5 |  | 75 | 0.315 |
| 24.0 |  | 75 | 0.400 | 25.5 |  | 75 | 0.400 |
| 25.0 | 38 | 75 | 0.500 | 26.5 | 41 | 75 | 0.500 |
| 26.5 | 42 | 75 | 0.630 | 27.5 | 51 | 75 | 0.630 |
| 27.0 |  | 75 | 0.710 | 28.5 |  | 75 | 0.710 |
| 27.5 | 48 | 75 | 0.800 | 29.0 | 56 | 75 | 0.800 |
| 29.0 | 58 | 75 | 1.000 | 31.0 | 64 | 75 | 1.000 |
| 30.5 | 55 | 75 | 1.250 | 31.5 | 52 | 75 | 1.250 |
| 30.5 |  | 75 | 1.500 | 31.5 |  | 75 | 1.500 |

TABLE V-continued

| With Microspheres | | | | Without Microspheres | | | |
|---|---|---|---|---|---|---|---|
| Aid Gain dB | Total Harmonic Dist. % | Aid In dB | Freq. In KHZ | Aid Gain db | Total Harmonic Dist. % | Aid In dB | Freq. In KHZ |
| 30.5 | 35 | 75 | 1.600 | 32.0 | 35 | 75 | 1.600 |
| 32.5 | | 75 | 2.000 | 34.0 | | 75 | 2.000 |
| 34.0 | | 75 | 2.500 | 34.0 | | 75 | 2.500 |
| 30.5 | | 75 | 3.150 | 31.0 | | 75 | 3.150 |
| 28.0 | | 75 | 4.000 | 29.5 | | 75 | 4.000 |
| 27.0 | | 75 | 5.000 | 29.5 | | 75 | 5.000 |
| 19.5 | | 75 | 6.300 | 16.0 | | 75 | 6.300 |
| 8.0 | | 75 | 8.000 | 7.0 | | 75 | 8.000 |
| 6.0 | | 75 | 9.999 | −2.0 | | 75 | 9.999 |

TABLE VI

| With Microspheres | | | | Without Microspheres | | | |
|---|---|---|---|---|---|---|---|
| Aid Gain dB | Total Harmonic Dist. % | Aid In dB | Freq. In KHZ | Aid Gain db | Total Harmonic Dist. % | Aid In dB | Freq. In KHZ |
| 12.5 | | 75 | 0.100 | 15.0 | | 75 | 0.100 |
| 14.5 | | 75 | 0.125 | 17.5 | | 75 | 0.125 |
| 16.0 | | 75 | 0.160 | 18.5 | | 75 | 0.160 |
| 18.0 | | 75 | 0.200 | 21.0 | | 75 | 0.200 |
| 18.5 | | 75 | 0.250 | 22.5 | | 75 | 0.250 |
| 21.5 | | 75 | 0.315 | 24.0 | | 75 | 0.315 |
| 22.5 | | 75 | 0.400 | 25.0 | | 75 | 0.400 |
| 24.0 | 6 | 75 | 0.500 | 26.0 | 18 | 75 | 0.500 |
| 25.0 | 16 | 75 | 0.630 | 27.0 | 34 | 75 | 0.630 |
| 25.5 | | 75 | 0.710 | 27.0 | | 75 | 0.710 |
| 26.0 | 13 | 75 | 0.800 | 27.5 | 23 | 75 | 0.800 |
| 27.5 | 19 | 75 | 1.000 | 30.0 | 40 | 75 | 1.000 |
| 30.5 | 16 | 75 | 1.250 | 32.0 | 30 | 75 | 1.250 |
| 33.0 | | 75 | 1.500 | 34.0 | | 75 | 1.500 |
| 34.0 | 27 | 75 | 1.600 | 34.5 | 31 | 75 | 1.600 |
| 36.5 | | 75 | 2.000 | 37.0 | | 75 | 2.000 |
| 37.5 | | 75 | 2.500 | 37.5 | | 75 | 2.500 |
| 35.5 | | 75 | 3.150 | 35.5 | | 75 | 3.150 |
| 31.0 | | 75 | 4.000 | 31.0 | | 75 | 4.000 |
| 33.0 | | 75 | 5.000 | 32.0 | | 75 | 5.000 |
| 17.5 | | 75 | 6.300 | 18.5 | | 75 | 6.300 |
| −2.5 | | 75 | 8.000 | −3.5 | | 75 | 8.000 |
| −10.0 | | 75 | 9.999 | −7.5 | | 75 | 9.999 |

TABLE VII

| With Microspheres | | | | Without Microspheres | | | |
|---|---|---|---|---|---|---|---|
| Aid Gain dB | Total Harmonic Dist. % | Aid In dB | Freq. In KHZ | Aid Gain db | Total Harmonic Dist. % | Aid In dB | Freq. In KHZ |
| 12.5 | | 80 | 0.100 | 14.5 | | 80 | 0.100 |
| 14.5 | | 80 | 0.125 | 16.5 | | 80 | 0.125 |
| 16.0 | | 80 | 0.160 | 17.5 | | 80 | 0.160 |
| 17.0 | | 80 | 0.200 | 19.0 | | 80 | 0.200 |
| 18.0 | | 80 | 0.250 | 20.5 | | 80 | 0.250 |
| 20.5 | | 80 | 0.315 | 21.5 | | 80 | 0.315 |
| 21.5 | | 80 | 0.400 | 22.5 | | 80 | 0.400 |
| 22.5 | 34 | 80 | 0.500 | 24.0 | 40 | 80 | 0.500 |
| 23.5 | 48 | 80 | 0.630 | 25.0 | 51 | 80 | 0.630 |
| 24.5 | | 80 | 0.710 | 25.5 | | 80 | 0.710 |
| 25.0 | 56 | 80 | 0.800 | 26.0 | 58 | 80 | 0.800 |
| 27.5 | 68 | 80 | 1.000 | 29.0 | 68 | 80 | 1.000 |
| 29.0 | 52 | 80 | 1.250 | 30.0 | 57 | 80 | 1.250 |
| 29.5 | | 80 | 1.500 | 30.0 | | 80 | 1.500 |
| 30.0 | 43 | 80 | 1.600 | 30.5 | 44 | 80 | 1.600 |
| 32.0 | | 80 | 2.000 | 32.5 | | 80 | 2.000 |
| 33.0 | | 80 | 2.500 | 33.0 | | 80 | 2.500 |
| 31.0 | | 80 | 3.150 | 31.0 | | 80 | 3.150 |
| 26.0 | | 80 | 4.000 | 26.0 | | 80 | 4.000 |
| 28.0 | | 80 | 5.000 | 27.5 | | 80 | 5.000 |
| 14.0 | | 80 | 6.300 | 15.0 | | 80 | 6.300 |
| −2.5 | | 80 | 8.000 | −4.0 | | 80 | 8.000 |

TABLE VII-continued

| With Microspheres | | | | Without Microspheres | | | |
|---|---|---|---|---|---|---|---|
| Aid Gain dB | Total Harmonic Dist. % | Aid In dB | Freq. In KHZ | Aid Gain db | Total Harmonic Dist. % | Aid In dB | Freq. In KHZ |
| −11.0 | | 80 | 9.999 | −8.5 | | 80 | 9.999 |

TABLE VIII

| With Microspheres | | | | Without Microspheres | | | |
|---|---|---|---|---|---|---|---|
| Aid Gain dB | Total Harmonic Dist. % | Aid In dB | Freq. In KHZ | Aid Gain db | Total Harmonic Dist. % | Aid In dB | Freq. In KHZ |
| 4.0 | | 80 | 0.100 | 11.0 | | 80 | 0.100 |
| 4.5 | | 80 | 0.125 | 12.0 | | 80 | 0.125 |
| 4.5 | | 80 | 0.160 | 15.5 | | 80 | 0.160 |
| 10.0 | | 80 | 0.200 | 16.0 | | 80 | 0.200 |
| 13.0 | | 80 | 0.250 | 18.0 | | 80 | 0.250 |
| 19.0 | | 80 | 0.315 | 21.0 | | 80 | 0.315 |
| 23.5 | | 80 | 0.400 | 22.0 | | 80 | 0.400 |
| 26.5 | 21 | 80 | 0.500 | 23.5 | 37 | 80 | 0.500 |
| 27.5 | 35 | 80 | 0.630 | 25.0 | 49 | 80 | 0.630 |
| 27.5 | | 80 | 0.710 | 25.5 | | 80 | 0.710 |
| 27.5 | 41 | 80 | 0.800 | 26.5 | 60 | 80 | 0.800 |
| 30.0 | 63 | 80 | 1.000 | 30.0 | 74 | 80 | 1.000 |
| 30.5 | 43 | 80 | 1.250 | 30.5 | 57 | 80 | 1.250 |
| 31.0 | | 80 | 1.500 | 31.0 | | 80 | 1.500 |
| 32.0 | 36 | 80 | 1.600 | 31.5 | 41 | 80 | 1.600 |
| 34.0 | | 80 | 2.000 | 34.0 | | 80 | 2.000 |
| 34.0 | | 80 | 2.500 | 34.0 | | 80 | 2.500 |
| 31.5 | | 80 | 3.150 | 31.5 | | 80 | 3.150 |
| 27.0 | | 80 | 4.000 | 27.0 | | 80 | 4.000 |
| 30.5 | | 80 | 5.000 | 30.0 | | 80 | 5.000 |
| 10.5 | | 80 | 6.300 | 11.5 | | 80 | 6.300 |
| −8.5 | | 80 | 8.000 | −.5 | | 80 | 8.000 |
| −10.5 | | 80 | 9.999 | −4.5 | | 80 | 9.999 |

TABLE IX

| Aid In dB | Freq. In KHZ | Total Harmonic Distortion % | |
|---|---|---|---|
| | | With Microspheres | Without Microspheres |
| 75 | 500 | 13 | 14 |
| 75 | 630 | 12 | 15 |
| 75 | 800 | 12 | 16 |
| 75 | 1000 | 15 | 62 |
| 75 | 1250 | 27 | 24 |
| 75 | 1600 | 14 | 87 |

TABLE X

| Aid In dB | Freq. In KHZ | Total Harmonic Distortion % | |
|---|---|---|---|
| | | With Microspheres | Without Microspheres |
| 80 | 500 | 14 | 11 |
| 80 | 630 | 16 | 18 |
| 80 | 800 | 11 | 20 |
| 80 | 1000 | 14 | 69 |
| 80 | 1250 | 21 | 55 |
| 80 | 1600 | 27 | 92 |

TABLE XI

| Aid In dB | Freq. In KHZ | Total Harmonic Distortion % | |
|---|---|---|---|
| | | With Microspheres | Without Microspheres |
| 85 | 500 | 38 | 16 |
| 85 | 630 | 11 | 20 |

TABLE XI-continued

| Aid In dB | Freq. In KHZ | Total Harmonic Distortion % | |
|---|---|---|---|
| | | With Microspheres | Without Microspheres |
| 85 | 800 | 17 | 34 |
| 85 | 1000 | 16 | 74 |
| 85 | 1250 | 16 | 67 |
| 85 | 1600 | 63 | 91 |

TABLE XII

| Aid In dB | Freq. In KHZ | Total Harmonic Distortion % | |
|---|---|---|---|
| | | With Microspheres | Without Microspheres |
| 90 | 500 | 48 | 23 |
| 90 | 630 | 10 | 23 |
| 90 | 800 | 19 | 46 |
| 90 | 1000 | 20 | 67 |
| 90 | 1250 | 18 | 65 |
| 90 | 1600 | 55 | 84 |

While various embodiments of the present invention have been described in detail, it is apparent that modifications and adaptations of those embodiments will occur to those skilled in the art. However, it is to be expressly understood that such modifications and adaptations are within the spirit and scope of the present invention as set forth in the following claims.

What is claimed is:

1. An earmold for conveying sound to the ear, said earmold comprising a plurality of microspheres in a polymeric matrix.

2. The earmold as defined in claim 1 wherein said microspheres are substantially dispersed in said matrix, forming a microsphere/polymeric matrix composite.

3. The earmold as defined in claim 2 wherein said microspheres comprise from about 5 to about 75 percent of the total volume of said composite.

4. The earmold as defined in claim 3 wherein said microspheres have a mean diameter between about 5 microns and about 5,000 microns.

5. The earmold as defined in claim 3 wherein said microspheres comprise from about 10 to about 50 percent of the total volume of said composite.

6. The earmold as defined in claim 5 wherein said microspheres are hollow glass beads having a mean diameter between about 10 and 200 microns.

7. The earmold as defined in claim 6 wherein said matrix comprises a poly(methyl methacrylate).

8. The earmold as defined in claim 1 wherein said microspheres have a mean diameter between about 5 microns and about 5,000 microns.

9. The earmold as defined in claim 1 wherein said microspheres have a mean diameter between about 20 microns and about 200 microns.

10. The earmold as defined in claim 1 wherein said microspheres comprise a material selected from the group consisting of ceramic, glass, mineral, and phenolic resin.

11. The earmold as defined in claim 10 wherein said microspheres are hollow glass beads.

12. The earmold as defined in claim 10 wherein said microspheres are solid glass beads.

13. The earmold as defined in claim 1 wherein said matrix is selected from the group consisting of silicones, polyvinyls, acrylics, polyolefins, polyamides, polyesters, and polyurethanes.

14. The earmold as defined in claim 13 wherein said matrix is a poly(methyl methacrylate).

15. The earmold as defined in claim 13 wherein said matrix is a silicone.

16. In a hearing aid having tube means for conveying sound, the improvement wherein said tube means comprises a composite of microspheres dispersed in a polymeric matrix.

17. The improvement of claim 16 wherein said tube means extends into the ear canal.

18. The improvement of claim 16 wherein said hearing aid is a behind-the-ear hearing aid and said tube means conveys sound from behind the ear into the ear canal.

19. The improvement of claim 16 wherein said hearing aid is an in-the-ear hearing aid comprising a shell for containing means for receiving and amplifying sound, said shell comprising said composite.

20. A method for reducing distortion of an acoustical waveform conveyed in a conduit, said method comprising forming said conduit from a composite comprising a plurality of microspheres and a polymeric matrix.

21. The method as defined in claim 20 wherein said microspheres comprise from about 5 to 75 percent of the total volume of said composite.

22. The method as defined in claim 20 wherein said microspheres have a mean diameter between about 5 microns and about 5,000 microns.

23. The method as defined in claim 20 wherein said microspheres comprise a material selected from the group consisting of ceramic, glass, mineral, and phenolic resin.

24. The method as defined in claim 20 wherein said matrix is selected from the group consisting of silicones, polyvinyls, acrylics, polyolefins, polyamides, polyesters, and polurethanes.

25. The method as defined in claim 20 where said conduit is an earmold.

26. The method as defined in claim 25 wherein said microspheres comprise from about 10 to 50 percent of the total volume of said composite.

27. The method as defined in claim 26 wherein said microspheres are hollow glass beads having a mean diameter between about 10 and 200 microns.

28. A hearing aid comprising a composite material, said material comprising a plurality of microspheres and a polymeric matrix.

29. The hearing aid as defined in claim 28 wherein said microspheres are hollow beads having a mean diameter between approximately 5 and 1,000 microns.

30. The hearing aid as defined in claim 29 wherein said microspheres have a mean diameter between approximately 50 and 100 microns.

31. The hearing aid as defined in claim 28 wherein said matrix is selected from the group consisting of silicone, polyvinyl, and acrylic.

32. The hearing aid as defined in claim 28 wherein said microspheres comprise between 10 and 45 percent of the total volume of said composite.

33. A telephone receiver comprising an output transducer and a composite, said composite comprising a plurality of microspheres and a polymeric matrix.

34. The telephone receiver as defined in claim 33 wherein said composite substantially surrounds said transducer.

35. The telephone receiver as defined in claim 33 wherein said composite forms a housing for said transducer.

36. The telephone receiver as defined in claim 33 wherein said matrix comprises a material selected from the group consisting of acrylonitrile-butadiene-styrene (ABS), polystyoene,

* * * * *